Patented Apr. 30, 1974

3,808,340
MEAT COATED PRODUCT
Hugh C. Palmer, Rutland, England, assignor to Kal Kan Foods, Inc., Vernon, Calif.
No Drawing. Filed July 12, 1971, Ser. No. 162,022
Int. Cl. A23k 1/10
U.S. Cl. 426—92     17 Claims

ABSTRACT OF THE DISCLOSURE

A food product comprising a core encased within a cover layer of substantial thickness, the core being substantially lower in palatability than the cover layer and comprising materials selected from the group consisting of proteinaceous and farinaceous vegetable foods and proteinaceous animal foods formed into pieces of desired size and shape, the cover layer consisting of a coating comprising animal tissue which both conceals and masks the flavor and appearance of the core and which displays the animal tissue as markedly present in flavor, aroma, and appearance.

SPECIFICATION

This invention relates to a food product, and its manufacture, having a central core of relatively inexpensive materials such as farinaceous and proteinaceous cereals, oilseeds, or animal meals, suitably processed and formed into pieces of desired bite size encased in a tenacious cover layer presenting the appearance, taste, and texture of a natural meat product. The food has many uses and is especially adapted for feeding domestic animals, although its use is not so limited.

The art has recognized that substantially complete cereal-containing dry or semidry or semimoist animal foods, which possess advantages in both cost and keeping qualities to many conventional canned meat or canned meat and cereal animal foods, are inferior thereto in palatability, appearance, and texture. Many suggestions have been made for improving the qualities of complete dry animal foods in those respects, but, so far as I am aware, none of the prior proposals have adequately met the need, and it is the primary object of the present invention to do so.

My basic objective is a food product combining a core with an outer cover layer which cover layer materially enhances the acceptance of the product by domestic animals as well as the preference for it in comparison with others and also appears meaty to the purchaser. Acceptance and preference standards are those conventionally recognized and applied in the industry.

In accordance with the preferred embodiment of my inversion, the cover layer in which the core is encased is composed of ingredients which provide optimum flavor and a meaty texture and appearance and is applied substantially uniformly over the surfaces of the chunk-sized bits of core to completely cover the core to a substantial depth by a process which retains or enhances the desired flavor. The cover layer has a flavor and texture which enhances palatability while avoiding an overly intense flavor and aroma which would defeat the objective of long-term acceptance, even though possibly enhancing the short-term preference for the product in a comparative preference test.

By my invention, I have obviated the faults inherent in prior proposals both of conventional taste-enhancing sprays and the like which, because of the thinness of their deposit, expose the core to the sensory perception of the animal, and also the faults of the thicker coating, gravy-producing products which, in use, leave the core exposed, to the distaste of the animal, upon the leaching action of water on the coat in the formation of the gravy.

The cover layer may be coagulated and dried to prevent spoiling so that the product is adapted for dry packaging; it may be uncoagulated and quick frozen and sold as such to be thawed before serving; it may be of a semi-moist consistency containing suitable preservatives and stabilizers to avoid spoilage without need for canning; or it may be of a coagulated moist type packaged and canned in a form comparable to conventional meatballs.

In any event, the cover layer is sufficiently thick and uniform for its intended purpose and in the combination it is adhered to the core with sufficient tenacity to preserve its integrity as an adequate cover in the event the food is admixed with water by the housewife in serving. A further characteristic is the ability of the cover layer to resist efforts, characteristic of dogs and cats, to remove and consume the more palatable components of a food mixture while leaving the rest.

The central core can be of a wide choice of materials of desired nutrient value, preferably a mixture of both proteinaceous and farinaceous components, such as cereals, legumes, meat or fish meals or essentially any of the materials common to food products of that nature. The materials can be compounded and shaped by conventional processes, coupled with additional process safeguards if needed to assure against the presentation on the core surface of sharp edges or projections which would detract unduly from the desired uniformity in thickness of the subsequently applied integument. Cold extrusion is suitable, provided any undesirable edges formed are then rounded as by tumbling or otherwise. My preference is for cooking expansion using known procedures which entail starch gelatinization and enlargement to a generally spherical or ovoid configuration. Surfaces rugosities or coarse granular irregularities are not necessarily to be avoided and indeed may be desirable as affording an interlock with the cover layer enhancing the strength of bond therebetween.

The cover layer is composed of meats, meat offals or by-products, fish or poultry scraps or mixtures thereof (herein referred to as animal tissue) comminuted and suitably processed for application to the core as a layer of desired uniformity and thickness. The terms meat and meat by-products are as defined by the American Association of Feed Control Officials (AAFCO). Additives are introduced depending upon the type of cover layer sought, whether dry, semi-dry, frozen, semi-moist or moist.

Where the objective is a dry coat, I may form a paste or cream of any desired meat, fish or poultry product comminuted to particle sizes generally ranging from 0.5–10 mm. diameter as a rough approximation and generally admixed with a small quantity of water to form a slurry in a mixer or a blender which does not excessively subdivide the solids to the point of liquefying or otherwise destroying the meaty texture of the animal tissue. The slurry contains a preponderance of animal tissue materials and the balance, if any, being additives and water. The additives desirably include phosphates to gelatinize and swell the protein and adjust the viscosity of the slurry to impart the desired thickness of deposit by one or a plurality of successive coatings as may be desired. Preferably the slurry has the viscosity of a thick cream and is applied in a number of coats.

The coating is applied preferably by tumbling the core material with the coating slurry until the coating material is added in a quantity which, upon subsequent drying, will be present within the range of 1% to 75%, preferably 10 to 65% by weight of the finished product. With a cover layer of that thickness, the comparatively unattractive flavor and odor components of the core material are masked and restrained from migration to the surface, and the appearance of the core is effectively concealed.

The material thus applied may then be treated as by drying or roasting at elevated temperature, by deep fat frying or by rapid freeze drying in order to reduce its dispersibility in water. Where elevated temperatures are employed, care must be taken to avoid excessive heating which would volatilize the flavor components.

Semi-moist coatings are particularly desirable. By semi-moist coats, I mean the use of mixtures of animal and/or vegetable tissues which mixtures have a moisture content of between about 20 and 45% by weight, and are characterized by having a Water Activity ($A_w$) of less than 0.85, generally within the range 0.65–0.84. The methods by which low water activities are achieved are well known, and have been described in detail in the literature. Generally, low water activity is achieved by the inclusion in the food of one or more of the following classes of materials, in sufficient concentration to achieve the desired Water Activity: Salts, sugars, hydrophilic colloids (both polysaccharide colloids and polypeptide colloids), and polyhydric alcohols (defined as those alcohols possessing 2 or more hydroxyl groups). If desired, a fungistat such as potassium sorbate, may be employed in addition to materials which lower the water activity to further protect semi-moist formulations against mold growth.

When employing semi-moist coatings, it is preferable to also include a fungistat in the core material to prevent mold growth that may occur through migration of moisture from the semi-moist coat to the core.

The appearance of the cover layer will differ depending upon which type of cover layer is employed. The cover layer has a meaty appearance and desirably exhibits a fibrous texture comparable to that of dried beef. Whichever type of cover layer is used, whether dry, semidry, semimoist, moist or frozen, the cover layer may be pasteurized or not as desired. Furthermore, a semi-permeable or hydrophobic membrane may be introduced between the cover layer and core to inhibit the migration of moisture between the cover layer and core. All normal food additives may be employed in the cover and/or the core, including, for example, antioxidants, coloring materials, flavors, flavor precursors, flavor-enhancing substances, acidulants, humectants, vitamins, minerals, and stabilizers.

The coated material will normally be coagulated in the finished coated product but need not be if the finished product is frozen. When the coated product is intended for use in canning, the coating material need only be coagulated and not dried, and even in this case coagulation may be allowed to occur during the canning and retorting process and need not be carried out before then. The coating material may be prepared as a true emulsion and not show any macroscopic fibrous structure or may be a meat mixture which is recognizable as being fibrous. Muscle meat, when included in the coating material, is fibrous and unless very finely divided will give a visible fibrous composition. Offals such as liver, for example, are not fibrous and do not result in a visible fibrous composition. The coat may be either porous or dense. Higher porosity is sometimes desirable and may be achieved, if desired, by aeration. Higher porosity gives increased hydratability and improved flavor release and texture.

As referred to herein, the cover layer may have a wide range of moisture content which I designate by the following categories:

"dry" means less than about 12% moisture by weight;
"semidry" means a moisture content of between about 12 and 20% by weight;
"semimoist" means a moisture content of between about 20 and 45% by weight;
"moist" means a moisture content of between about 45 and 90% by weight.

In its method aspect, the present invention affords the application of the coat of outer material onto the core as, for example, by enrobing, spraying, laminating, or tumbling. Heat setting of the applied coat, where required, can be carried out by oven heating, by infrared or microwave heating or by immersion in hot water or oil. It may be found necessary to make the coating emulsion of higher moisture content than required for the final product in order to obtain the desired viscosity of emulsion for effective coating. In that circumstance, the final heating of the product may be prolonged to drive off water from the coat and so obtain the desired final moisture content.

EXAMPLE I

| Core material: | Percent by weight |
|---|---|
| Wheat flour | 25.0 |
| Soybean meal | 25.0 |
| Cracked barley | 20.0 |
| Corn starch (modified) | 3.7 |
| Water | 26.3 |
| | 100.0 |

| Coating material: | |
|---|---|
| Beef gullets | 92.6 |
| Sodium nitrite solution (2% aqueous) | 0.4 |
| Sodium tri-polyphosphate | 0.5 |
| Water | 6.5 |
| | 100.0 |

The core material is blended and then extruded through conventional cold forming extrusion equipment to form pieces approximately ⅝" long and ⅝" cross sectional diameter. The extruded pieces are then tumbled to round the edges and then dried by heating in a convectional hot air oven at 250° F. for 30 minutes, after which the product is air cooled prior to coating.

The coating mix is prepared by first grinding the beef gullets through a 3⁄16" grinder plate, after which the ground gullets are mixed in a Hobart mixer with the remaining components for approximately 2 minutes in order to disperse completely the nitrite, phosphate and water. The mixing action in the presence of phosphate tends to gelatinize and swell the protein comprising the minute muscle fibers, thus improving the tackiness or cohesiveness of the coating material and obtaining the desired viscosity of thick cream. Following the preparation of the coating mixture, 3 parts by weight of the previously prepared core material and 1 part by weight of the coating mixture are introduced into a pan-coating machine and tumbled together for approximately 3 minutes. The coating mix becomes evenly dispersed over the surface of the core material. The coated particles are then partially dried in a convectional hot air oven at 200° F. for 10 minutes, during which time coagulation of the coating takes place. The material is further dehydrated by vacuum drying in order to reduce the moisture content to below 10%.

The product exhibits a substantially uniform coat throughout which is of good thickness, of the order of several millimeters. The coat is observed to adhere firmly to the core. When the product is immersed in water, partial hydration occurs, liberating some of the flavor components into the aqueous phase but the coat does not disperse in the water. This is attributable to the coagulation of the meat protein present in the beef gullets. The product, when fed dry to dogs, exhibits a high acceptance and, in particular, exhibits a significantly higher acceptance than conventional nutritionally complete dry dog foods. In addition, the coated product is very significantly preferred by dogs to conventional uncoated dry foods in a preference test.

Coagulation to inhibit water dispersability can be accomplished in other ways, as, for example, by deep fat frying or by microwave treatment or infrared grilling.

EXAMPLE II

The core material and coating material of Example I are used in a procedure following that of Example I up to and including the pan coating stage. The coated product is then frozen by direct immersion in liquid nitrogen. This form represents a suitable product for marketing as a frozen dog food. Before being fed to the animal, the product normally is allowed to thaw at ambient temperature and again has high acceptability and is significantly preferred to conventional dry foods. The coating material is not readily dispersible in water.

EXAMPLE III

| Core material: | Percent by weight |
| --- | --- |
| Crushed wheat | 40.40 |
| Meat meal | 9.95 |
| Fish meal | 6.00 |
| Pollard (wheat bran) | 30.00 |
| Skim milk powder | 3.00 |
| Linseed meal | 3.00 |
| Salt | 0.50 |
| Wheat germ | 2.00 |
| Yeast | 3.00 |
| Calcium phosphate | 2.00 |
| Amaranth (dye) | 0.05 |
| Sunset Yellow (dye) | 0.10 |
|  | 100.00 |

The ingredients in the formula are thoroughly mixed and then subjected to expansion by partial gelatinization of the cereal starch under heat and pressure, followed by release of pressure and drying to give an expanded, dry aerated cereal product. Expansion is accomplished using a conventional Wenger-type expander and process.

| Coating material: | Percent by weight |
| --- | --- |
| Meat mix: |  |
| Tongue roots | 55.30 |
| Liver | 11.20 |
| Chicken necks | 11.20 |
| Minced veal | 11.20 |
| Wheatose (glucose syrup, 80% solids DE 43) | 8.25 |
| Sodium nitrite solution (0.2%) | 1.04 |
| Buttermilk | 0.08 |
| Salt | 1.65 |
| Sodium tripolyphosphate | 0.08 |
|  | 100.00 |

| Water color mix: | Percent by weight |
| --- | --- |
| Water | 98.0 |
| Hydroxy propyl methyl cellulose | 1.5 |
| Color mix | 0.5 |
|  | 100.0 |

Final coating material:
  10 parts meat mix
  2 parts color mix
  1 part water

The expanded core particles are introduced into a pan coater together with coating material in the ratio of 72.5% core pellets to 27.5% coating material by weight and tumbled together until an even coat of coating material on the pellets is obtained.

The coated pellets are then deep fat fried by immersion in beef tallow at 300° F. for approximately 75 seconds, during which frying process the water content is reduced to approximately 8–10%. The beef tallow used contains 0.01% BHA as an antioxidant. The product was acceptance tested on dogs and found to possess a very high acceptance, significantly higher than the acceptance of conventional dry dog foods.

EXAMPLE IV

Meat coating formula as in Example III is used except the liver and veal are replaced by fat meat trimmings.

The coated product is produced as in Example III up to and including the pan coating operation. The coated product is then subjected to roasting by passing the product on a belt through a hot air convection gas heated oven at a temperature of 550–600° F. for approximately 2 minutes. During this oven cooking, the moisture content is reduced to between 8–10% and the product exiting from the oven is observed to have the color, appearance, and smell of pieces of roasted meat. When tested on dogs, the product was found to possess a very high acceptance, significantly higher than the acceptance of conventional dry dog foods.

EXAMPLE V

Core material—as in Example I.

| Coating material | Percent by weight |
| --- | --- |
| Chicken necks and backs | 25.0 |
| Tongue roots | 25.0 |
| Beef tripe | 10.0 |
| Beef cheeks | 10.0 |
| Liver | 5.0 |
| Ground bone slurry (50% bone) | 5.0 |
| Rice flour | 6.0 |
| Added water | 10.0 |
| Salt | 2.0 |
| Fresh beef blood | 1.5 |
| Sodium nitrite solution (2%) | 0.5 |

The meat ingredients of the coating mix are each ground through a ⅛" plate, then thoroughly mixed with the remainder of the ingredients of the coating mix. The mixture is then further comminuted by passing it through a Mincemaster comminuter fitted with a 3 millimeter plate to produce a viscous meat emulsion similar in viscosity to conventional sausage emulsions.

The coating material is then coated onto the core particles in the ratio of 4 parts of coat to 1 part of core in the following manner. A thin layer of coating material is deposited on a belt and individual core pieces are dropped onto the layered coating material. A second layer of coating material is then deposited in such a manner as to overlay the core particles. The thicknes of the upper and lower layers of coating mix is adjusted to give the correct 4:1 coat:core ratio. The sandwiched product thus produced is then cut with knives in order to separate it into individually coated core pieces. The coated pieces are then canned in a starch-thickened gravy in the ratio of 60% by weight pieces to 40% by weight gravy, and the canned product is subjected to conventional commercial retorting at 260° F. for 60 minutes in order to render the product commercially sterile. The canned product was compared with a conventional meatball product of similar formulation, and the product was found to be highly preferred to the conventional meatball product in a dog preference test. The canned coated product was also subjected to an acceptance test and was found to possess a significantly higher acceptance than conventional meatball products of similar formulation.

EXAMPLE VI

Core material.—Expanded cereal formula as in Example III.

Coating Material.—Commercially available freeze dried, diced cooked beef (distributed by Richmore Corporation, P.O. Box 2728, Van Nuys, Calif. 91404).

The expanded cereal pellets, of approximately spherical shape and of approximately ⅝" diameter, are introduced into a Hobart mixer fitted with a dough hook and slowly agitated while corn syrup is applied from a pressure gun in the form of a spray. Spraying is continued until all the core pieces are thinly coated with the syrup to give a ratio of approximately 90% by weight core to 10% corn syrup. The syrup-coated pieces are then rolled in the dried, diced cooked beef, which had been previously ground in a pestle and mortar to form a powder. The powdered dry meat was found to adhere evenly to the syrup-coated core particles to give a product of the following composition:

| | Percent |
|---|---|
| Cereal core | 86.3 |
| Corn syrup | 10.3 |
| Powdered dry beef (coat) | 3.4 |
| | 100.0 |

The coated product thus produced was preference tested on dogs against a commercially available nutritionally complete dried food and was found to be significantly preferred.

EXAMPLE VII

Core material:

| | Percent by weight |
|---|---|
| Ground wheat | 36.8 |
| Ground maize | 36.8 |
| Potassium sorbate | 0.3 |
| Water | 6.0 |
| Meat meal | 20.0 |
| Vitamin/mineral mix | 0.1 |
| | 100.0 |

Coating material:

| | Percent by weight |
|---|---|
| Meat and meat byproducts | 56.90 |
| Liver | 13.10 |
| Beef blood | 1.60 |
| Potassium sorbate | 0.30 |
| Nitrite solution (2%) (sodium) | 0.75 |
| Propylene glycol | 11.00 |
| Erythrosine solution (2.2%) | 0.50 |
| Vitamin solution | 1.40 |
| Fine wholemeal wheat flour | 12.20 |
| Bone flour | 0.65 |
| Salt | 1.60 |
| | 100.00 |

The coating ingredients are prepared as a viscous emulsion by the method described in Example V.

A meat coated product is produced by a method in which multiple thin coats of coating ingredients are applied to the core material and each coat is partially dried before the next coat is applied, to give the finished product which has 63% by weight of dried coat to 37% by weight of core.

A general description of the method of coating employed was as follows:

A quantity of core is introduced into a span coater which has internal baffles and is capable of rotating, and a quantity of coating material is added to the core material in the pan coater. The two are tumbled together until such time as the coating material is evenly distributed over the core. The coated pieces are then spread as a monolayer on trays and toasted in a forced-convection gas fired oven until a coat moisture of approximately 25% is achieved. The partially dried product is then re-introduced into the pan coater and further emulsion added. The procedure is then repeated several times until a total meat emulsion weight of 3 times the original dry weight of cereal has been applied. This normally takes 5 applications. The ratio can be achieved in fewer stages with a rougher finish result. Similarly, a smoother surface is formed if more than 5 applications are used. The exact conditions employed in a typical process are summarized in the following control chart:

| Coating stage | Weight of biscuit (or partially coated biscuit) (lb.) | Added meat emulsion (lbs.) | Toasting temps., degs. F. | Toasting cooking time (min.) | Lbs. lost (mostly water) |
|---|---|---|---|---|---|
| 1 | 35.0 | 10.5 | 325 | 5 | 5 |
| 2 | 40.5 | 15.75 | 325 | 6 | 7.75 |
| 3 | 48.5 | 19.25 | 325 | 7.5 | 8.5 |
| 4 | 59.25 | 24.5 | 325 | 9 | 10.25 |
| 5 | 73.5 | 35.0 | 325 | 11 | 13.75 |
| Total | | 105.00 | | | |

Note.—Yield=94.75 lbs. of finished product.

A typical analysis for the finished coated product would be as follows:

| | Percent by weight |
|---|---|
| Total water content | 19 |
| Coat water content | 25 |
| Fat | 9 |
| Protein | 20 |
| Propylene glycol (in coat) | 12.5 |
| Total water activity | 0.76 |
| Coat water activity | 0.75 |

The coated product has the appearance and feel of a piece of partially dried meat or more byproduct. When fed to animals in an acceptance test, the product possesses a significantly higher acceptance then conventional nutritionally complete dry foods and also possesses a higher acceptance than conventional soft moist or semimoist dog foods currently being marketed.

The product was found to be microbiologically stable without the need for further drying by virtue of possessing low water activity ($A_w$), induced primarily by the use of a polyhydric alcohol, and by the incorporation of potassium sorbate as a fungistat.

EXAMPLE VIII

Core material.—This was prepared as in Example VII.

Coating material:

| | Percent by weigth |
|---|---|
| Meat and meat byproducts | 42.6 |
| Liver | 11.0 |
| Blood | 1.2 |
| Fine wholemeal wheat flour | 9.0 |
| Propylene glycol | 17.0 |
| Salt | 1.2 |
| Bone flour | 0.5 |
| Sodium nitrite solution (2%) | 0.6 |
| Vitamin solution | 1.1 |
| Potassium sorbate | 0.3 |
| Erythrosine solution (2.2%) | 0.5 |
| Gum arabic | 15.0 |
| | 100.0 |

The meat coating material is prepared as an emulsion by the method described in Example V. The meat emulsion is then coated onto the core material in the ratio of 2 parts of meat emulsion to 1 part by weight of core. The coating is accomplished by the multiple pan coating and toasting technique described in Example VII. The final product is oven dried as in Example VII to achieve a moisture of approximately 25% in the coating. The product thus produced is found to be microbiologically stable without the need for further drying. Furthermore, the product is found to be more acceptable than conventional complete dry dog foods, and semimoist dog foods.

EXAMPLE IX

Core material.—This was prepared as in Example VII.

| Coating material: | Percent by weight |
|---|---|
| Meat and meat byproducts | 38.0 |
| Liver | 10.0 |
| Blood | 1.0 |
| Propylene glycol | 17.0 |
| Meat meal | 30.0 |
| Salt | 1.0 |
| Bone flour | 0.5 |
| Sodium nitrite solution (2%) | 0.6 |
| Vitamin solution | 1.1 |
| Potassium sorbate | 0.3 |
| Erythrosine solution (2.2%) | 0.5 |
| | 100.0 |

The coating material is prepared as an emulsion by the method described in Example V.

A coated product is prepared by applying the meat coating material to the core in the ratio of 4 parts by weight of meat coating to 1 part by weight of core by the method previously described in Example VII. The coated product is oven dried as previously described to give a final moisture content of approximately 25% in the coating. The product produced is found to be microbiologically stable without the need for further drying. Furthermore, the product is found to be more acceptable to dogs than conventional complete dry, and semimoist dog foods.

EXAMPLE X

Core material.—This was prepared as in Example VII.

| Coating material: | Percent by weight |
|---|---|
| Meat and meat offals | 46.5 |
| Liver | 11.5 |
| Blood | 1.5 |
| Fine wholemeal | 10.0 |
| Propylene glycol | 3.8 |
| Glycerol | 21.5 |
| Salt | 1.2 |
| Bone flour | 0.5 |
| Sodium nitrite solution (2%) | 0.7 |
| Vitamin solution | 1.0 |
| Potassium sorbate | 0.3 |
| Carboxymethylcellulose | 1.0 |
| Erythrosine solution (2.2%) | 0.5 |
| | 100.0 |

The coated product is prepared by applying meat coating emulsion to core in the ratio of 4 parts by weight of meat coating emulsion to 1 part by weight of core as previously described. The coated product is oven dried to give a final moisture of approximately 25% in the coating as in the two previous examples. The product produced was found to be microbiologically stable without the need for further drying, and was found to be more acceptable to dogs than conventional complete dry, and semimoist foods.

EXAMPLES XI, XII, XIII AND XIV

Products are prepared according to Examples VII, VIII, IX, and X respectively but oven drying is continued in each case to achieve a final moisture content of less than 10% in the coating.

I claim:

1. An animal food product having the substantial appearance, flavor and aroma of meat tissue in the form of discrete, bite-sized pieces comprising cores enclosed within covers of substantial thickness encasing the surfaces and tenaciously bonded around, concealing and masking the taste and appearance of said cores, said covers comprising a substantial quantity of natural meat materials as animal tissue solids to provide the flavor, taste and aroma characteristics of meat tissue of high palatability, and masking said core material, said cores being formed of material of generally lower palatability and composed in substantial part of starch-containing cereal alone or admixed with animal meals or fish meals.

2. The food product defined in claim 1 in which the cores have been shaped into pellets and dried.

3. The food product defined in claim 1 in which the cores are dip coated from a slurry to form said covers.

4. The food product defined in claim 1 in which the meat tissue of said covers is coagulated.

5. The food product defined in claim 1 in which the cover is dried to less than 12% moisture by weight.

6. The food product defined in claim 1 in which the cover is frozen.

7. The food product defined in claim 1 in which the casing is of a weight substantially exceeding that of the core.

8. The food product defined in claim 1 in which the cover has been treated to reduce its dispersibility in water.

9. The food product defined in claim 1 in which the cover is semimoist in consistency having a water content of between 20% and 45% by weight and a Water Activity of less than 0.85.

10. The food product defined in claim 9 in which the core contains a fungistat to inhibit mold growth from moisture migrating from the cover.

11. An animal food presenting the substantial appearance, flavor and aroma suggestive of meat tissue comprising cores composed in substantial part of starch-containing cereal that has been ground and shaped into self-sustaining pieces of desired size encased within cover layers of substantial thickness comprising finely divided material composed predominantly of meat tissue solids, the pieces having been cooked to coagulate the meat tissue, thereby enhancing the bond between cores and cover layers, and to reduce the moisture content of the covers, thereby enhancing microbiological stability, and the pieces presenting externally a rough surface appearance with the flavor and odor of meat tissue effectively masking the appearance, flavor and odor of the cores.

12. A semimoist animal food presenting the flavor and aroma suggestive of meat tissue comprising cores composed in substantial part of starch-containing cereal that has been ground and shaped into self-sustaining pieces of desired size encased within cover layers comprising finely divided material composed predominantly of meat tissue solids comminuted and admixed with a substantial quantity of at least one agent adapted to depress water activity (Aw), the pieces having been cooked to coagulate the meat tissue, thereby enhancing the bond between cores and cover layers, and to reduce the moisture content of the covers, thereby enhancing microbiological stability, and the pieces presenting externally a rough surface appearance and a soft, meat-like taste and texture effectively masking the appearance, flavor and odor of the cores.

13. As an animal food, a mass of discrete particles comprising coherent, shape-retaining cores enclosed within casings having substantial thickness substantially covering and tenaciously bonded around the said cores, the cores being composed in substantial part of starch-containing cereal that has been ground and shaped into self-sustaining pieces of desired size encased within cover layers of a material composed in substantial part of meat tissue solids exhibiting characteristics of the meat tissue from which it was obtained, the said cover layers being adapted to absorb and retain a selected quantity of moisture characterizing the cover layers ranging from semimoist to dry, the pieces having been cooked to coagulate the meat tissue, thereby enhancing the bond between cores and cover layers and reducing the moisture content of the covers to enhance their microbiological stability, the pieces presenting externally the smell and taste of meat tissue.

14. The method of making animal food pieces having the substantial appearance, flavor and aroma of meat tissue, comprising forming discrete bite-sized core materials of generally low palatability and composed in substantial part of starch-containing cereal alone or admixed with animal meals or fish meals, applying to the cores covers of substantial thickness encasing the surfaces and concealing and masking the taste and appearance of said cores, said covers comprising a substantial quantity of natural meat materials as animal tissue solids to provide the flavor, taste and aroma characteristics of meat tissue of high palatability and masking said core material, and thereafter cooking the pieces to coagulate the meat materials in the cover, thereby enhancing the bond between cores and cover layers, reducing the moisture content of the covers, and enhancing microbiological stability.

15. The food product as defined in claim 1 in which the said covers are present in a quantity ranging from 1% to 75% by weight of the product.

16. The food product as defined in claim 1 in which the said covers are present in a quantity ranging from 10% to 65% by weight of the product.

17. The food product as defined in claim 1 in which the said cores are comprised of one or more materials selected from the group consisting of wheat, soy bean, barley, wheat bran and maize alone or admixed with animal meals or fish meals.

References Cited

UNITED STATES PATENTS

| | | | |
|---|---|---|---|
| 2,963,376 | 12/1960 | Hogan et al. | 99—108 |
| 3,131,066 | 4/1964 | Mitzelfelt | 99—108 |
| 3,348,954 | 10/1967 | Green | 99—7 |
| 3,119,691 | 1/1964 | Ludington et al. | 99—2 |
| 3,542,564 | 11/1970 | Cornwell | 99—108 |
| 3,489,574 | 1/1970 | Du Puis | 99—7 |
| 3,482,998 | 12/1969 | Carroll et al. | 99—108 |
| 3,447,929 | 6/1969 | Hale | 99—7 |
| 3,202,514 | 8/1965 | Burgess et al. | 99—2 |
| 3,113,030 | 12/1963 | Brody | 99—108 |
| 2,676,107 | 4/1954 | Hestnes | 99—194 |

OTHER REFERENCES

| | | | |
|---|---|---|---|
| 614,987 | 12/1948 | Great Britain | 99—108 |
| 3,417,760 | 1/1931 | Great Britain | 99—108 |

JOSEPH SCOVRONEK, Primary Examiner

S. B. DAVIS, Assistant Examiner

U.S. Cl. X.R.

426—227, 305

PO-1050
(5/69)

UNITED STATES PATENT OFFICE
CERTIFICATE OF CORRECTION

Patent No. 3,808,340            Dated April 30, 1974

Inventor(s) Hugh C. Palmer

It is certified that error appears in the above-identified patent and that said Letters Patent are hereby corrected as shown below:

Column 1, line 52, "inversion" should be --invention--;

Column 7, line 58, "span" should be --pan--;

Column 8, line 28, "more" should be --meat--;

Signed and sealed this 15th day of October 1974.

(SEAL)
Attest:

McCOY M. GIBSON JR.
Attesting Officer

C. MARSHALL DANN
Commissioner of Patents

REEXAMINATION CERTIFICATE (176th)

United States Patent [19]

Palmer

[11] B1 3,808,340

[45] Certificate Issued Mar. 20, 1984

[54] MEAT COATED PRODUCT

[75] Inventor: Hugh C. Palmer, Rutland, England

[73] Assignee: Kal Kan Foods, Inc., Vernon, Calif.

Reexamination Request:
No. 90/000,057, Aug. 17, 1981

Reexamination Certificate for:
Patent No.: 3,808,340
Issued: Apr. 30, 1974
Appl. No.: 162,022
Filed: Jul. 12, 1971

Certificate of Correction issued Oct. 15, 1974.

[51] Int. Cl.³ .............. A23K 1/10; A23K 1/14; A23K 1/18
[52] U.S. Cl. .................... 426/92; 426/305; 426/623; 426/630; 426/635; 426/805
[58] Field of Search ............. 426/92, 305, 532, 630, 426/646, 805, 623, 635

[56] References Cited

U.S. PATENT DOCUMENTS

| | | | |
|---|---|---|---|
| 3,348,954 | 10/1967 | Green | 426/646 X |
| 3,542,564 | 11/1970 | Cornwell | 426/646 X |
| 3,615,647 | 10/1971 | Kassens | 426/92 |

OTHER PUBLICATIONS

"Bacon Meat Loaf with Olive Stuffing", *Favorite Recipes of American Home Economics Teachers*, 1962, p. 67, published by the Home Ec. Press, Inc., of Washington, D.C.

*Primary Examiner*—Arthur L. Corbin

[57] ABSTRACT

A food product comprising a core encased within a cover layer of substantial thickness, the core being substantially lower in palatability than the cover layer and comprising materials selected from the group consisting of proteinaceous and farinaceous vegetable foods and proteinaceous animal foods formed into pieces of desired size and shape, the cover layer consisting of a coating comprising animal tissue which both conceals and masks the flavor and appearance of the core and which displays the animal tissue as markedly present in flavor, aroma, and appearance.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

Claims 1-17 having been finally determined to be unpatentable, are cancelled.

* * * * *